United States Patent
Clem et al.

(10) Patent No.: US 6,521,562 B1
(45) Date of Patent: Feb. 18, 2003

(54) PREPARATION OF MOLECULAR SIEVE CATALYSTS MICRO-FILTRATION

(75) Inventors: Kenneth R. Clem, Humble, TX (US); Luc R. M. Martens, Meise (BE); Stephen N. Vaughn, Kingwood, TX (US); Paul R. Stafford, Anderson, SC (US); John W. Kress, Seneca, SC (US); Machteld M. Mertens, Boortmeerbeek (BE)

(73) Assignee: ExxonMobil Chemical Patents, Inc., Houston, TX (US)

( * ) Notice: Subject to any disclaimer, the term of this patent is extended or adjusted under 35 U.S.C. 154(b) by 48 days.

(21) Appl. No.: 09/672,469

(22) Filed: Sep. 28, 2000

(51) Int. Cl.$^7$ ............ B01J 27/182; B01J 29/00
(52) U.S. Cl. ............ 502/214; 502/64; 502/65; 502/66; 502/208; 502/209; 502/210; 502/211; 502/212; 502/213
(58) Field of Search ............ 502/208, 209, 502/210, 211, 212, 213, 214, 64, 65, 66

(56) References Cited

U.S. PATENT DOCUMENTS

| | | |
|---|---|---|
| 4,130,485 A | 12/1978 | Dyer et al. |
| 4,440,871 A | 4/1984 | Lok et al. |
| 5,074,989 A | 12/1991 | Sigaud et al. ............ 208/161 |
| 5,126,308 A | 6/1992 | Barger et al. |
| 5,191,141 A | 3/1993 | Barger et al. |
| 5,520,796 A | 5/1996 | Chen et al. ............ 208/65 |
| 5,902,917 A * | 5/1999 | Collins et al. ............ 585/315 |
| 5,919,721 A | 7/1999 | Potter |
| 5,942,104 A * | 8/1999 | Miller ............ 208/108 |

FOREIGN PATENT DOCUMENTS

| | | | |
|---|---|---|---|
| GB | 1356741 | 6/1974 | |
| WO | WO 93/06917 | 4/1993 | ............ B01D/61/14 |
| WO | WO 97/45196 | 12/1997 | ............ B01J/29/06 |

OTHER PUBLICATIONS

T. Inui et al., 1990 "Preparation of Silico–Alumino–Phosphates by the Rapid Crystallization Method and their Catalytic Performance in the Conversion of Methanol to Light Olefins" Applied Catalysis, 58 (1990) 155–163. (No Month).

* cited by examiner

*Primary Examiner*—Elizabeth D. Wood

(57) ABSTRACT

A method of making a molecular sieve catalyst by preparing a catalyst slurry containing molecular sieve, binder and a matrix material and directing the slurry to a forming unit. The catalyst slurry is prepared by using a microfiltration process whereby the molecular sieve is washed and concentrated from a preparation medium without having to isolate the molecular sieve in a dry or semi-dry form. The catalyst is used to make ethylene and propylene from an oxygenate.

35 Claims, 2 Drawing Sheets

PREPARATION OF MOLECULAR SIEVE CATALYSTS MICRO-FILTRATION

FIELD OF THE INVENTION

This invention is related to molecular sieve catalysts and a method of making such catalysts. In particular, the invention is directed to a method of preparing a slurry containing molecular sieve using microfiltration. The invention is also directed to converting an oxygenate to a product containing olefin by contacting the oxygenate with the catalyst of the invention.

BACKGROUND OF THE INVENTION

Olefins, particularly light olefins, have been traditionally produced from petroleum feedstocks by either catalytic or steam cracking. Oxygenates, however, are becoming an alternative feedstock for making light olefins. Particularly promising oxygenate feedstocks are alcohols, such as methanol and ethanol, dimethyl ether, methyl ethyl ether, diethyl ether, dimethyl carbonate, and methyl formate. Many of these oxygenates can be produced from a variety of sources including synthesis gas derived from natural gas; petroleum liquids; carbonaceous materials, including coal; recycled plastics; municipal wastes; or any appropriate organic material. Because of the wide variety of relatively inexpensive sources, alcohol, alcohol derivatives, and other oxygenates have promise as an economical, non-petroleum source for light olefin production.

One way of producing olefins is by the catalytic conversion of methanol using a silicoaluminophosphate (SAPO) molecular sieve catalyst. See, for example, U.S. Pat. Nos. 5,912,393 and 5,191,141 to Barger et al. U.S. Pat. No. 4,499,327 to Kaiser, discloses making olefins from methanol using SAPO molecular sieve catalysts. The process can be carried out at a temperature between 300° C. and 500° C., a pressure between 0.1 atmosphere to 100 atmospheres, and a weight hourly space velocity (WHSV) of between 0.1 and 40 $hr^{-1}$.

U.S. Pat. No. 4,130,485 to Dyer et al. discloses a method of concentrating particulate solids having a particle size distribution from about 0.1 to 50 microns using a solid, porous, tubular microfilter. Wash water is added to the slurry while the slurry is concentrated by the microfilter until the desired purity of slurry is obtained. The addition of wash fluid is halted, and the slurry is further concentrated to a 11% solid content.

U.K. Patent Application 1,356,741 discloses a method of concentrating biological solids with at least two microfilters in series. The first microfilter consisted of a pore size of 0.45 $\mu$m, and the second a 0.22 $\mu$m pore filter.

U.S. Pat. No. 5,919,729 to Potter discloses the use of a microfilter to maximize the amount of zeolite molecular sieve less than 1 $\mu$m in the concentrate. The initial catalyst slurry contains solids with an average size of 0.3 microns and an initial concentration of about 20% by weight solids. The concentrate of the final slurry is about 40% by weight solids. After repetitive washings with wash fluid, the concentrate is removed from the microfilter and dried by vacuum filtration.

U.S. Pat. No. 5,126,308 suggests that SAPO molecular sieve with an average particle diameter of which 50% are less than 1.0 $\mu$m and no more than 10% are greater than 2.0 $\mu$m lead to an increase in catalytic activity and selectivity. The laboratory prepared SAPO is recovered by centrifugation, washed with water, dried, and formed into pellets.

Inui et al. in *Applied Catalysis*, vol. 58, p. 155–163, 1990, shows that relatively small SAPO-34 particles can be prepared by what is known as a rapid crystallization method. This method produces SAPO-34 particles in the range of 0.5 to 2 $\mu$m. The laboratory prepared SAPO is washed with water, recovered by centrifugation and dried.

After the molecular sieve particles are prepared, the molecular sieve particles must be separated from its preparation mixture or crystallization solution. Conventional laboratory-scale separation procedures include centrifugation and pressure filtration. However, both of these methods prove to be impractical for commercial-scale production of molecular sieve particles. A large-scale centrifugation process, because of the capital and operational costs, is economically impractical. In the case of pressure filtration, the smaller particles form a compacted filter cake on top the filter medium. The result is a significant decrease in flux rate of wash fluid across the filter cake and through the pores of the filter which leads to long processing times. Also, channels may develop in the filter cake which allows the wash fluid to pass trough the filter cake without contacting most of the molecular sieve particles. As a result, the molecular sieve is inadequately washed, and contaminants from the preparation mixture are incorporated into the catalyst.

The formation of the compacted filter cake also leads to very high pressure drops across the filter medium, which may result in failure of the filtering medium. Most pressure filters are designed to withstand a maximum pressure drop of about 75 psi. The pressure drop across a bed of solids is proportional to the mass flow of the filtrate through the filter, filtrate viscosity (thus, hot water is often used to reduce viscosity), cake thickness, and cake resistance. Cake resistance is inversely proportional to the square of the effective particle diameter, and proportional to the porosity of the cake. As an example, a pressure drop across a bed of 0.3 micron diameter solids will be at least 16 times that of a pressure drop across a bed of 1.2 microns diameter solids, due to smaller particle size, assuming all other properties are equal. Further, since these smaller sized particles are more compressible, the void volume (related to bed porosity) also decreases, resulting in even more increase in pressure drop. Accordingly, conventional filtration processes becomes very difficult because of these large pressure drops across beds of small particles.

Novel methanol-to-olefin (MTO) catalysts are needed which exhibit a high ethylene and propylene selectivity, an increase resistance to coking, or an increase in resistance to attrition. Catalysts with relatively small, average particle size molecular sieve could provide significant steps in one or all three of these areas of catalyst development. However, present methods of isolating commercial-scale quantities of these smaller molecular sieve particles from their preparative solutions, such as by centrifugation or pressure filtration, is either too costly and/or very inefficient. Methods to effectively recover small, molecular sieve particles, and a method of incorporating them into catalyst are needed.

SUMMARY OF THE INVENTION

This invention is directed to a molecular sieve catalyst wherein the molecular sieve is washed and concentrated as a slurry from a preparation mixture using a microfiltration process. The permeate from the microfiltration process has a conductivity from 50 $\mu$mho/cm to 5000 $\mu$mho/cm. The catalyst contains molecular sieves selected from aluminophosphates, metal-aluminophosphates, silicoaluminophosphates, metal-silicoaluminophosphates, and mixtures thereof. Preferably, the catalyst comprises molecular sieves comprising SAPO-18, SAPO-34, SAPO-35, SAPO-44, SAPO-47, ALPO-5, ALPO-11, ALPO-18, ALPO-34, ALPO-36, ALPO-37, ALPO-46, metal containing forms of each thereof, or mixtures thereof in the amount from 10% to 60% by weight based on the weight of calcined catalyst. The molecular sieve catalyst also contains a binder, preferably silica, silica-alumina, or alumina, present in the amount from 5% to 20% by weight based on the weight of uncalcined catalyst, and optionally a matrix material, preferably at least one clay, more preferably kaolin, present in an amount from 30% to 90% by weight based on the weight of calcined catalyst.

The invention is also directed to a process for making a catalyst. The process includes preparing a molecular sieve slurry containing molecular sieve and at least one fluid. The molecular sieve is mixed with a binder, and optionally a matrix material to from a catalyst slurry. The catalyst slurry is then directed to a forming unit, preferably a spray dryer, to produce the catalyst. The catalyst slurry preferably has a total solid content from 30% to 50% by weight.

The process of preparing the molecular sieve slurry includes concentrating the molecular sieve from a preparation mixture with a microfilter; washing the molecular sieve and any of the remaining preparation mixture with a wash fluid; and concentrating the molecular sieve from the wash fluid and any remaining preparation mixture with the microfilter. The process may also include concentrating a permeate with a nanofilter, the permeate obtained from concentrating the molecular sieve, and returning at least a portion of the concentrated permeate to a process stream used in the preparation of the molecular sieve. The microfilter pressure drop across the porous walls of the microfilter is preferably from 10 psi to 80 psi, more preferably from 15 psi to 50 psi. The temperature of the molecular sieve slurry is preferably maintained at a temperature from 10° C. to 90° C., more preferably from 30° C. to 60° C.

In some cases it is not necessary to concentrate the molecular sieve from the preparation mixture prior to adding the wash fluid. Instead, the wash fluid is added to the molecular sieve and preparation mixture before the molecular sieve is concentrated by the microfilter. In other cases, the molecular sieve may be concentrated from the preparation mixture prior to adding the wash fluid by using conventional filtration techniques, or using a microfilter with a pore size greater than 10 microns.

The invention is also directed to a method of making ethylene and propylene by contacting the molecular sieve catalyst of the invention with an oxygenate under conditions to convert the oxygenate. The process of making the catalyst includes preparing a molecular sieve slurry containing molecular sieve and a fluid, mixing a binder, and optionally a matrix material with the molecular sieve slurry to form a catalyst slurry, and directing the catalyst slurry to a forming unit.

BRIEF DESCRIPTION OF THE DRAWINGS

The invention will be better understood by reference to the Detailed Description of the Invention when taken together with the attached drawings, wherein.

DETAILED DESCRIPTION OF THE INVENTION

Figure 1:
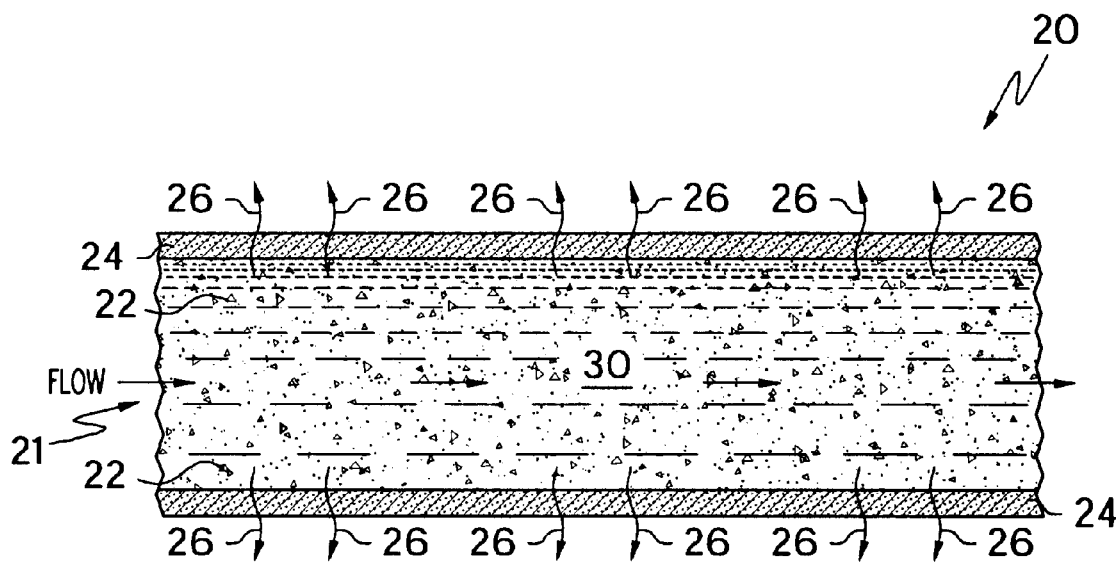
FIG. 1 is a cross-section of a porous filter channel during the filtration process in the microfilter.

This invention overcomes many of the problems associated with small particle filtration by using a microfiltration process. The microfiltration process provides a method to separate and wash the molecular sieve from the preparation mixture without isolating the molecular sieve particles in its dry form. The molecular sieve, preferably with an average particle diameter of less than 5 microns, is washed and separated from the other chemical components in the preparation mixture as a molecular sieve slurry with a selected solid content and a selected purity level of the molecular sieve slurry fluid. The molecular sieve is not collected as a dried solid. The molecular sieve slurry is then combined with other formulating components of the catalyst, such as binders and/or matrix materials, to form a catalyst slurry. Prior to mixing with the molecular sieve slurry the formulating components may exist as dry or semi-wet solids or as slurries. The catalyst slurry is then directed to a forming unit selected from an extrusion unit, a pelletizing unit, or a spray dryer. It is preferred that the catalyst slurry be spray dried.

The microfiltration process may include a batch process, a semi-batch process, or a continuous process to concentrate and separate the molecular sieve from the preparation mixture or crystallization solution. In the batch process a given amount of preparation slurry containing molecular sieve and the other components of the preparation mixture is added to a holding tank. The components in the preparation mixture include the solvent used in the synthesis or recrystalization, as well as unreacted template, e.g., tetraethylammonium hydroxide (TEOH), dipropylamine (DPA), and aluminum, silicon, and phosphorous containing chemical components. The initial solid content of molecular sieve in the preparation slurry is approximately between 5% and 30% by weight. The preparation slurry is directed to a filter, and a portion of the preparation mixture is separated from the slurry as the preparation mixture passes through the pores of the filter.

The filter used to initially concentrate the molecular sieve from the preparation mixture may be a conventional macrofilter or a microfilter. If a macrofilter is used, the permeate from the macrofilter is directed to the microfiltration process to further separate the relatively small molecular sieve particles that passed through the pores of the macrofilter with the preparation mixture. The molecular sieve collected with the macrofilter is filtered and washed using conventional methods, such as pressure filtration. This molecular sieve can be combined with the molecular sieve slurry obtained from the microfiltration process prior to the addition of binder and/or matrix material. If a microfilter is used, the molecular sieve is partially separated or concentrated from the preparation mixture by passing the preparation slurry through the channels of the microfilter, a given amount of wash fluid is added, the molecular sieve slurry and wash fluid is mixed in a holding tank, and the microfiltration is repeated. The steps of washing and partially filtering are repeated until the permeate passing through the pores of the microfilter is of a desired purity level. The purity level in the permeate, i.e., the amount of unwanted chemical components in the permeate, indicates the proportion of the chemical components contained in the molecular sieve slurry. It is preferred that the molecular sieve is washed with wash fluid until the permeate has a conductivity of 50 $\mu$mho/cm to 5000 $\mu$mho/cm. The molecular sieve slurry containing molecular sieve, about 20% to 50% by weight, and wash fluid, preferably water, an alcohol, or a mixture thereof, is then directed to a catalyst formulation process. The wash fluid may contact the molecular sieve slurry from the backside of the microfilter so as to remove a portion of filter cake from the wall of the porous filter channel. This cake removal process is commonly referred to as "back washing."

It is to be understood by one skilled in the art, that the batch process of the invention described above can be practiced in other ways. For example, the preparation slurry from the synthesis can be mixed with a portion of wash fluid prior to concentrating the molecular sieve. Also, the invention is adaptable to a continuous process, such that the preparation slurry is directed to a holding tank. From the holding tank, the preparation slurry is directed to the microfilter while wash fluid is added. The rate of preparation slurry added to the process of the invention is related to the rate of molecular sieve slurry removed from the process, the rate of wash fluid added, and the desired steady-state level of chemical components in the permeate.

The process of the invention may include concentrating the permeate from the microfilter with a nanofilter. Some or all of the concentrated permeate can then be recycled to a process stream used in the preparation of the molecular sieve. The term "permeate" is defined in the specification as any proportion of preparation mixture and/or wash fluid that is collected after having passed through the pores of the microfilter from any one or all of the concentrating steps in the process of the invention.

The term "particle" is defined in the specification as any molecular solid having a dimensional volume. The molecular solid can be crystalline or amorphous, or may have portions that are crystalline and other portions amorphous. The molecular solid can be a single crystal, or an agglomerate of single crystals and or a mixture of single crystals and amorphous solids.

The term "microfilter" is defined as a device having a porous material with nominal pore opening of about 0.05 micron to 10 microns. The term "nanofilter" is defined as a device having a porous material with nominal pore opening of about 0.5 nanometer to 10 nanometers. The term "macrofilter" is defined as a device having a porous material with nominal pore opening of greater than 10 microns. The porous materials used in the microfilters and nanofilters are generally known in the art and include, but are not limited to, polymers, ceramics, and sintered metals. The pore size of the microfilter should be less than the average particle size of the molecular sieve, however this is not required. A microfilter having a pore size greater than the average particle size of the molecular sieve will generally collect most of the smaller particles.

The slurry containing the molecular sieve, the wash fluid, and any remaining preparation mixture contains 20% to 60% by weight, preferably 25% to 40% by weight of the molecular sieve. After the molecular sieve has been washed to the desired point and collected, the process may include mixing a matrix material with the molecular sieve prior to, with, or following the mixing of the binder with the molecular sieve. Preferably, the matrix material comprises at least one clay, more preferably kaolin clay, and is present in the amount from 30% to 90% percent by weight based on the weight of calcined catalyst. Preferably, the binder comprises silica, silica-alumina or alumina present in the amount from 5% to 20% by weight based on the weight of calcined catalyst. Typically, if alumina is to be incorporated as a binder, the source of the alumina is peptized alumina or aluminum chlorhydrol. The aluminum chlorhydrol is converted to alumina following heating of the prepared catalyst.

FIG. 1 depicts a cross-section of a porous microfilter channel 20 as the molecular sieve slurry 30 is being concentrated. The molecular sieve slurry includes the preparation mixture, which contains the chemical components from the synthesis dissolved or suspended in an aqueous liquid 21 and the molecular sieve particles 22, which flow along the length of the channel 20. The walls 24 of the channel 20 are porous and some of the preparation mixture passes through the walls 24, as depicted by the arrows 26, while the molecular sieve particles 22 are retained inside the channel 20. The pore size of the filter channel 20 is selected to retain the desired size of particles 22. As a result, particles 22 larger than the pore size of the channel 20 do not pass through the walls 24 of the channel 20, while preparation mixture in the aqueous liquid 21 and small sized particles that are much smaller than the pore size pass through the walls 24 of the channel 20. High mass flux rates parallel to the surface of the filter channel 20 minimizes the build-up of molecular sieve particles from clogging the pore surface of the filter channel 20.

It is to be understood that although FIG. 1 depicts the slurry 30 flowing in the interior portion of the channel 20, the process of the invention can also be practiced with the slurry 30 flowing along the outside surface of the channel and the permeate entering the interior portion.

Figure 2:
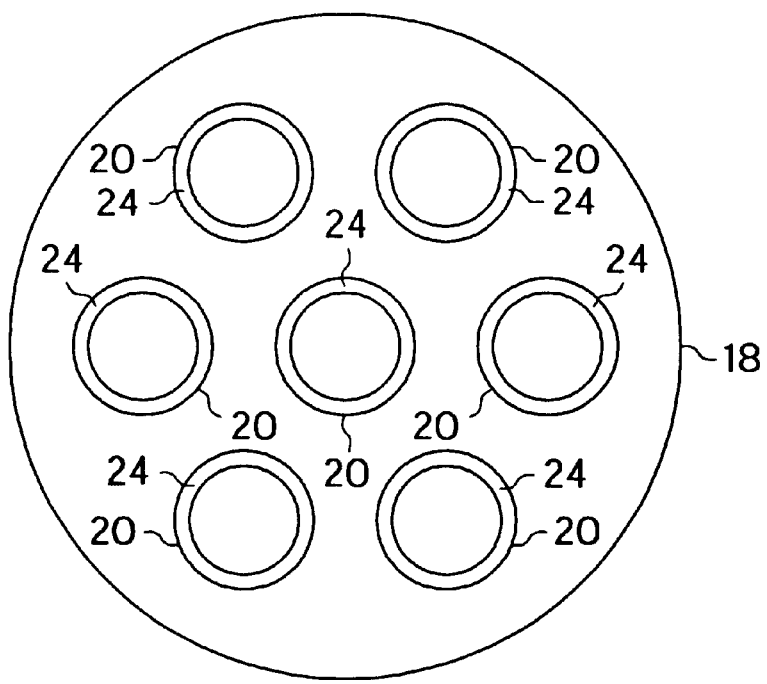
FIG. 2 is a cross-section of the microfilter with a plurality of porous filter channels.

A microfilter 18 is shown in FIG. 2. The microfilter 18 may consist of a bundle of filter channels 20 having fibered, porous walls 24 as shown in FIG. 2. Slurry, not shown, is injected into one end of a channel 20 and removed from the opposite end of the channel 20. The microfilter 18 is similar in construction and appearance to a conventional single-pass shell and tube heat exchanger. Alternatively, the microfilter can consist of a bundle of sintered ceramic or metal channels with a well defined pore size. Generally, microfilters are made out of a variety of materials including, but not limited to, polymers (such as cellulose acetate), sintered metal, or ceramics. Also, the invention is not limited to the use of a cylindrical microfilter. Other geometrically shaped microfilters can be used, such as flat sheets or spiral wound sheets.

Figure 3:
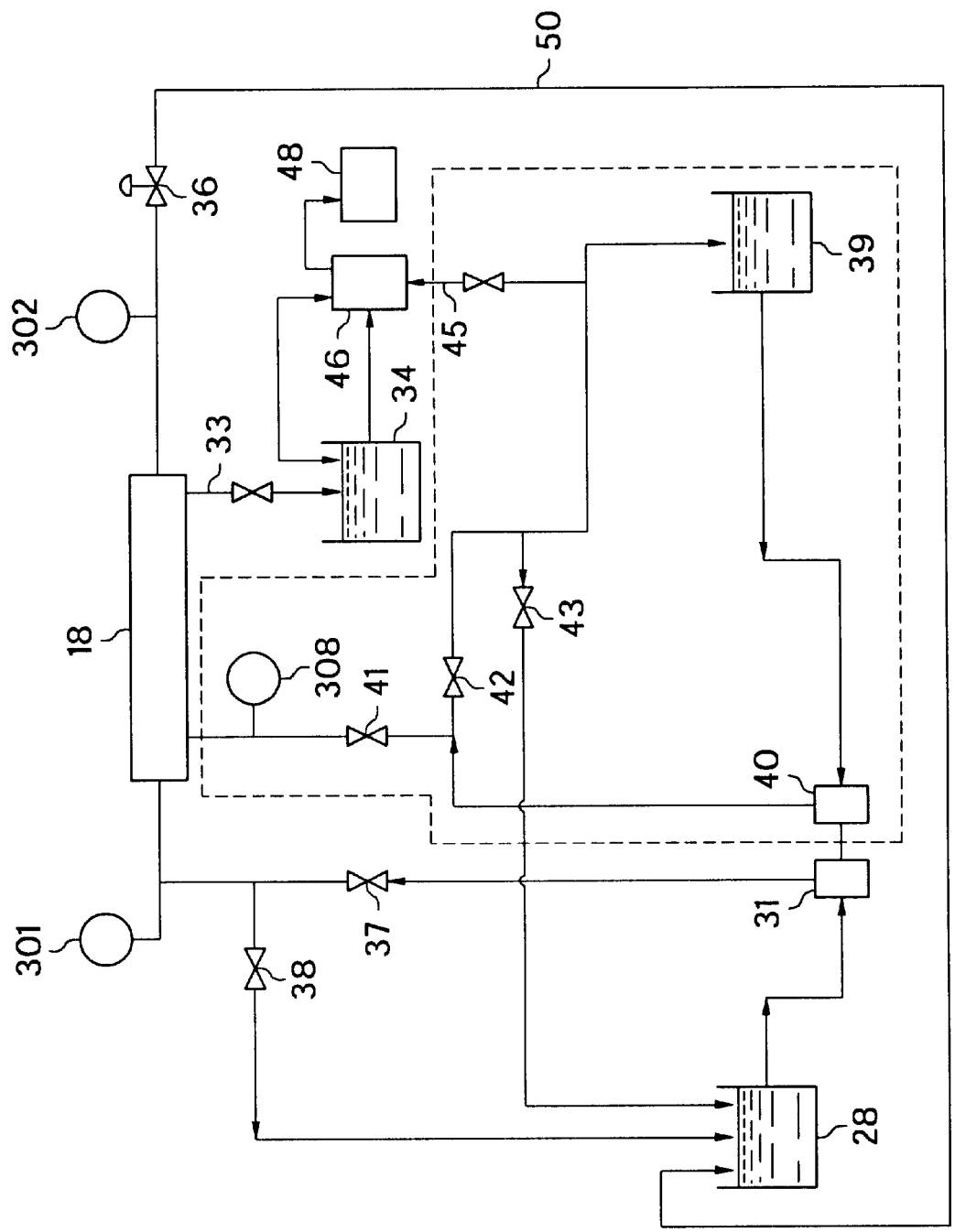
FIG. 3 depicts a block diagram of the microfiltration system of the invention.

This invention differs from conventional microfiltration or ultrafiltration methods because of the high solid content present in the slurry 30, shown in FIG. 1. Preferably, the invention processes slurry 30 with 5% to 60%, more preferably 5% to 40% percent by weight molecular sieve particles 22. The invention concentrates and washes large volumes of slurry 30 containing large amounts of particles 22. The washed and concentrated molecular sieve slurry is then mixed with binder and/or matrix material to produce a molecular sieve catalyst slurry, which is directed to a forming unit and processed into catalyst. The portions of the permeate can be discarded, recycled, concentrated and recycled, or any combination thereof The microfiltration process of the invention can be a batch process with a given amount of slurry to be washed and concentrated in slurry feed tank 28, as shown in FIG. 3. Alternatively, one of ordinary skill in the art would recognize that a batch process can be modified with input streams, output streams, and optionally a recycle stream, thereby converting the batch process shown in FIG. 3 to a continuous flow process. As shown, the system has two fluid loops; a slurry feed loop and a wash fluid loop (enclosed by dotted lines). The slurry loop circulates the slurry 30 through the microfilter 18 and back to the slurry tank 28. The wash fluid loop circulates wash fluid or back wash to the microfilter 18 and the slurry feed tank 28. In the slurry loop, the slurry 30 is directed from the slurry feed tank 28 to a pump 31 and then to the microfilter 18. Following passage through the porous filter channels 20, the slurry 30 is recycled back to the slurry feed tank 28 via stream 50.

Typically flow rates for conventional microfiltration are about 250 L/min per m² of tube cross-section, if 1 mm diameter channels are used. However, because molecular sieve slurries are very viscous, slurry feed rates are limited to 10 to 60 L/min per/m² of tube cross-sectional area, preferably from 15 to 35 L/min per m², to avoid overpressuring the filter channels near the inlet of the microfilter. The highest slurry feed rate is determined by the mechanical integrity of the microfilter 18, particularly the mechanical integrity of the filter channel walls 24. The inlet portion of the filter tubes must be able to mechanically withstand the high pressure associated with high feed rates without partial or complete physical disintegration due to excessive pressure drop across the walls 24 of the channels 20 at the inlet end. At very low slurry feed rates the minimum pressure drop across the wall 24 near the outlet of the microfilter 18 is 15 to 30 psi. The corresponding pressure drop across the walls 24 near the inlet of the microfilter 18 is 30 to 50 psi. Higher pressure drops will generally facilitate the rate of filtration, however, the higher pressure drops may also necessitate the use of stronger filter elements.

The pressure in the filter channel 20 may be controlled by a pressure control valve 36 at the discharge end of the microfilter 18 and measured by pressure indicator 302. The pressure drop in the channels 20 along the length of the channels 20 depend on the flow rate. The pressure drop increases with increasing flow rate, which may be adjusted by a flow control valve 37 positioned on the inlet side of the microfilter 18. In addition, valve 38 may be employed to partially recirculate slurry 30 to the slurry tank 28. Thus, valves 37 and 38 control the flow rate entering the microfilter 32. The pressure drops at the inlet and outlet ends of the microfilter 32 are interrelated, and for a given process and microfilter adjustment of one may require appropriate adjustment of the other. For example, if the slurry flow rate is increased the outlet back pressure should be lowered.

The pore size is selected to prevent virtually all particles larger than a desired size from passing through or permeating the porous wall 24 of the filter channel 20. The pore size of the microfilter 18 is based upon the average particle size of the molecular sieve and is preselected to retain the smallest desired particles. The aqueous liquid which passes through the walls 24 comprises the permeate stream 33; this permeate stream 33 is analogous to a filtrate stream in a pressure filtration process and is collected in tank 34. The pressure (measured by pressure indicator 301) maintained on a fluid injected into the filter microfilter 18 supplies the pressure drop needed to force some of the permeate (preparation mixture and/or wash fluid) through the walls 24 on each pass. The pressure across the porous walls 24 must be high enough to force permeate through the walls 24 but not so high as to over pressure and distort or tear the walls 24. Usually, a fluid circulating pump 31 and motor 35 provide this positive pressure. The opposite side or back end of the channel 20 is at ambient pressure and is connected to a means for collecting permeate which is then directed to tank 34. Alternatively, the back end of the channel 20 may be placed under a partial vacuum or exposed to a pressure above atmospheric pressure.

It is possible during microfiltration (or ultrafiltration) for a high concentration of solids to congregate near the surface of the walls 24 thus reducing permeate flow. Thus, for a constant flow rate, increasing the pressure drop across the wall 24 of the channel 20. This is known as "concentration polarization". When this occurs, the microfilter 18 is back washed with wash fluid to reduce the concentration of solids near the inside wall of the channel 20. Back washing is done using the back wash fluid in container 39, via pump 40 and valve 41, as shown in FIG. 3. The back washing aids in the removal of particles concentrated along the inside wall of the microfilter 18. It is often desirable to maintain a constant concentration of slurry 30 in the slurry feed tank 28. This requires a source of make-up fluid from container 39, via pump 40 and valves 42 and 43, to replace any fluid lost from the slurry 30 via the permeate stream 33. Thus, the back wash loop is also used to provide make-up fluid and any make-up fluid is preferably heated.

The process of concentrating the permeate (shown as process 46 in FIG. 3) collected in tank 34 is very similar to the process of concentrating the slurry 30. However, because the solid contents of the permeate is very low, significantly less amounts of back wash, if any, is added from stream 45 to the process 46. The permeate from tank 34 is pumped to a nanofilter positioned within process 46. The nanofilter can be made from organic or inorganic components, for example, polymers, sintered metal, ceramics, or composites thereof In much the same way the pressures and flow rates are controlled by a series of flow valves and pressure valves. The concentrated permeate is recycled back to tank 34. The permeate from the nanofilter is collected in tank 48. Portions of the concentrated permeate can be recycled back to the sieve synthesis unit to reduce material costs, or treated and properly discarded. The second permeate resulting from the nanofiltration process can also be recycled in the process of the invention, the synthesis unit, or disposed of The detailed batch process for washing and recovery of a molecular sieve slurry by microfiltration (or ultrafiltration) in accordance with the teachings of the present invention is as follows:

1. A batch of molecular sieve particles recovered from the preparation mixture are slurried in wash fluid, preferably water. However, it may at times be necessary to concentrate the preparation mixture and particles from the synthesis process if relatively low yields of molecular sieve are obtained in the synthesis. Alternatively, portions of the preparation mixture may be removed by vacuum applications with or without heating. The slurry from the process synthesis may also be pre-filtered using conventional methods to remove the relatively larger molecular sieve particles prior to directing the slurry to the microfilter.

2. Although optional, preferably, the slurry is initially concentrated to approximately 30 percent by weight solids by microfiltering without adding any wash fluid or back wash to the slurry. This initial concentration step reduces the amount of wash fluid needed in subsequent steps by removing the majority of contaminants contained in the preparation mixture. An initial slurry flow rate of 10 to 60 (or more) L/min per m² of cross-sectional entry area of the filter cartridge and preferably 20 to 30 L/min per m² may be established. This flow rate is reduced with time to maintain an acceptable pressure drop across the microfilter's walls at the inlet and outlet of the hollow fibers as the slurry concentrates. The initial concentration step is stopped when the pressure exceeds a preselected maximum pressure allowed across the filter media, such as for example, 15 psi across the wall for a particular filter unit that has a maximum pressure limitation of 20 psi. The maximum across-the-wall pressure is an operating characteristic of a particular filter and is determined by the manufacturer of the filter cartridge; thus, the slurry is concentrated to some maximum concentration functionally related to the operating characteristics of the filter. The filter may be back flushed with a minimum amount of wash fluid to remove a portion of the filter cake from the walls and then, optionally, the concentration is continued. Any number of such back washing steps may be employed during the initial concentration step. A final back wash may be performed after the final, initial concentration step is completed.

3. Once the concentration step is completed, a make-up fluid flow is started that matches permeate flow through the microfilter. This is the washing step of the process. The feed rate is gradually increased to maintain a preselected pressure across the filter walls as contaminants are removed, such as for example about 10 psi for a filter unit with a maximum pressure limitation of 20 psi. As permeate flow rate increases, the makeup fluid feed rate is increased.

Alternatively, "washing" of the molecular sieve particles may be accomplished by repeating the concentration step followed by a back washing step a sufficient number of times to achieve the desired molecular sieve slurry composition.

The final concentration based upon the across-the-wall pressure limit of the filter unit is typically 20 wt % to 60 wt % slurry concentration for current non-metallic or nonceramic cartridges. The filter is run at its maximum across-the-wall pressure until no more permeate is discharged and the wash or concentration step is then stopped. Again, this maximum concentration is functionally related to an operating characteristic of the filter. However, higher solids contents may be achievable with different microfiltration equipment and microfilters. The final solids concentration will be determined by the mechanical strength (maximum pressure limit across the wall) of the filter used, the ability of the pumping system to pump the thickened slurry, and the slurry components.

To determine when the slurry has been adequately washed with wash fluid, and thus ready for the addition of other catalyst components, the chemical or physical properties of the permeate are measured. For example, the conductivity or density of the permeate can be measured. The degree of washing will depend upon the intended use of the molecular sieve slurry. It is preferred that the conductivity of the permeate be 50 $\mu$mho/cm to 5000 $\mu$mho/cm prior to making the catalyst slurry.

Temperature of the molecular sieve slurry has a significant effect on the flow rate of the permeate through the pores of the microfilter. The temperature is preferably maintained below 75° C. with a preferred temperature of 55° C. to 65° C. In general, the higher the temperature of the molecular sieve slurry, the lower the viscosity of the slurry. This means permeate flow rate is higher at any given pressure differential across the hollow fibers or alternatively, pressure may be reduced while maintaining a constant permeate flow rate. Higher final slurry concentrations are achieved at higher temperatures, but the slurry temperature should be maintained below the boiling point of the fluid, and may be further limited by the necessity of maintaining the temperature below any temperature limit imposed by the relative stability of the chemical components of the slurry as well as the materials of the microfilter.

For a commercial process the volumes/areas/pore size of the microfilter 18, flow rates, and temperatures all are appropriately selected based upon the desired unit capacity, slurry properties and equipment specifications. The maximum allowable pressure for the microfilter 18 is determined by the microfilter manufacturer. Microfilters are commonly operated at pressures of 1 psi to 50 psi, although higher pressure microfilters can be used in the process. A parallel bank of microfilters 18 may be employed to increase the volume of slurry to be concentrated. A suitable slurry recirculating pump 40 is selected, as is a flow controller 37 and back pressure regulator 36. This system also has a means for back washing, permeate removal, and slurry transfer to and from the microfiltration process, as well as a slurry processing unit, such as a spray dryer. Further, appropriate process instrumentation and controls may be included to automate the process.

An optional second filtration step may be employed. If used, this portion of the apparatus can be used to further separate components in the permeate collected in vessel 34 described as part of the first stage filtration. A nanofilter, can be used to separate, for example, water, from inorganic or organic components present in the first permeate stream 33. Nanofiltration membranes are generally considered to be materials with pore openings of 0.5 nanometer to 10 nanometers. Operation is in general similar to the operation of the microfiltration except that typically nano-filtration cartridges are more efficiently used at 40 psig to 200 psig.

The preferred molecular sieve catalyst used in the invention is one that incorporates a silicoaluminophosphate (SAPO) molecular sieve. The molecular sieve comprises a three-dimensional microporous crystal framework structure of $[SiO_2]$, $[AlO_2]$ and $[PO_2]$ corner sharing tetrahedral units. It is preferred that the silicoaluminophosphate molecular sieve used in this invention have a relatively low $Si/Al_2$ ratio. In general, the lower the $Si/Al_2$ ratio, the lower the $C_1$–$C_4$ saturates selectivity, particularly propane selectivity. A $Si/Al_2$ ratio of less than 0.65 is desirable, with a $Si/Al_2$ ratio of not greater than 0.40 being preferred, and a $Si/Al_2$ ratio of not greater than 0.32 being particularly preferred. A $Si/Al_2$ ratio of not greater than 0.20 is most preferred.

Silicoaluminophosphate molecular sieves are generally classified as being microporous materials having 8, 10, or 12 membered ring structures. These ring structures can have an average pore size from 3.5 to 15 angstroms. Preferred for MTO conversion are the small pore SAPO molecular sieves having an average pore size of less than 5 angstroms, preferably an average pore size ranging from 3.5 to 5 angstroms, more preferably from 3.5 to 4.2 angstroms. These pore sizes are typical of molecular sieves having 8 membered rings.

The $[PO_2]$ tetrahedral units within the framework structure of the molecular sieve of this invention can be provided by a variety of compositions. Examples of these phosphorus-containing compositions include phosphoric acid, organic phosphates such as triethyl phosphate, tetraethylammonium phosphates, and aluminophosphates. The phosphorous-containing compositions are mixed with reactive silicon and aluminum-containing compositions under the appropriate conditions to form the molecular sieve.

The $[AlO_2]$ tetrahedral units within the framework structure can be provided by a variety of compositions. Examples of these aluminum-containing compositions include aluminum alkoxides such as aluminum isopropoxide, aluminum phosphates, aluminum hydroxide, sodium aluminate, and pseudoboehmite. The aluminum-containing compositions are mixed with reactive silicon and phosphorus-containing compositions under the appropriate conditions to form the molecular sieve.

The $[SiO_2]$ tetrahedral units within the framework structure can be provided by a variety of compositions. Examples of these silicon-containing compositions include silica sols and silicium alkoxides such as tetra ethyl orthosilicate. The silicon-containing compositions are mixed with reactive aluminum and phosphorus-containing compositions under the appropriate conditions to form the molecular sieve.

Substituted SAPOs can also be used in this invention. These compounds are generally known as MeAPSOs or metal-containing silicoaluminophosphates. The metal can be alkali metal ions (Group IA), alkaline earth metal ions (Group IIA), rare earth ions, and the additional transition cations of Groups IVB, VB, VIB, VIIB, VIIIB, and IB. Preferably, the Me represents atoms such as Zn, Mg, Mn, Co, Ni, Ga, Fe, Ti, Zr, Ge, Sn, and Cr. These atoms can be inserted into the tetrahedral framework through a [MeO$_2$] tetrahedral unit. Incorporation of the metal component is typically accomplished adding the metal component during synthesis of the molecular sieve. However, post-synthesis treatments such as impregnation or ion exchange can also be used. In post synthesis ion exchange, the metal component will introduce cations at the surface of the molecular sieve, not into the framework itself Suitable silicoaluminophosphate molecular sieves include SAPO-5, SAPO-9, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, the metal containing forms thereof, and mixtures thereof. Preferred are SAPO-17, SAPO-18, SAPO-34, SAPO-35, SAPO-44, and SAPO-47, particularly SAPO-18 and SAPO-34, including the metal containing forms thereof, and mixtures thereof As used herein, the term mixture is synonymous with combination and is considered a composition of matter having two or more components in varying proportions, regardless of their physical state.

Another embodiment of the present invention comprises concentrating an aluminophosphate (ALPO) molecular sieve catalyst by microfiltration. Aluminophosphate molecular sieves are crystalline microporous oxides which can have an AlPO$_4$ framework. They can have additional elements within the framework, typically have uniform pore dimensions ranging from about 3 angstroms to about 10 angstroms, and are capable of making size selective separations of molecular species. More than two dozen structure types have been reported, including zeolite topological analogues. A more detailed description of the background and synthesis of aluminophosphates is found in U.S. Pat. No. 4,310,440, which is incorporated herein by reference in its entirety. Preferred ALPO structures are ALPO-5, ALPO-11, ALPO-18, ALPO-31, ALPO-34, ALPO-36, ALPO-37, and ALPO-46.

The ALPOs can also include a metal substituent in its framework. Preferably, the metal is selected from the group consisting of magnesium, manganese, zinc, cobalt, and mixtures thereof. These materials preferably exhibit adsorption, ion-exchange and/or catalytic properties similar to aluminosilicate, aluminophosphate and silica aluminophosphate molecular sieve compositions. Members of this class and their preparation are described in U.S. Pat. No. 4,567,029, incorporated herein by reference in its entirety.

The metal containing ALPOs have a three-dimensional microporous crystal framework structure of MO$_2$, AlO$_2$ and PO$_2$ tetrahedral units. These as manufactured structures (which contain template prior to calcination) can be represented by empirical chemical composition, on an anhydrous basis, as:

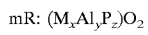

wherein "R" represents at least one organic templating agent present in the intracrystalline pore system; "m" represents the moles of "R" present per mole of (M$_x$Al$_y$P$_z$)O$_2$, the maximum value in each case depending upon the molecular dimensions of the templating agent and the available void volume of the pore system of the particular metal aluminophosphate involved, "x", "y", and "z" represent the mole fractions of the metal "M", (i.e. magnesium, manganese, zinc and cobalt), aluminum and phosphorus, respectively, present as tetrahedral oxides.

The metal containing ALPOs are often referred to by the acronym as MeAPO. Also in those cases where the metal "Me" in the composition is magnesium, the acronym MAPO is applied to the composition. Similarly ZAPO, MnAPO and CoAPO are applied to the compositions which contain zinc, manganese and cobalt respectively. To identify the various structural species which make up each of the classes MAPO, ZAPO, CoAPO and MnAPO, each species is assigned a number and is identified, for example, as ZAPO-5, MAPO-11 CoAPO-34 and so forth.

The silicoaluminophosphate molecular sieves are synthesized by hydrothermal crystallization methods generally known in the art. See, for example, U.S. Pat. Nos. 4,440,871; 4,861,743; 5,096,684; and 5,126,308, the methods of making of which are fully incorporated herein by reference. A reaction mixture is formed by mixing together reactive silicon, aluminum and phosphorus components, along with at least one template. Typically water or a water/alcohol mixture is used as a solvent. Generally the mixture is sealed and heated, preferably under autogenous pressure, to a temperature of at least 100° C., preferably from 100° C. to 250° C., until a crystalline product is formed. Formation of the crystalline product can take anywhere from around 2 hours to as much as 2 weeks. In some cases, stirring or seeding with crystalline material will facilitate the formation of the product.

Typically, the molecular sieve precipitates from the process solution, which can be the mother liquor. As a result of the crystallization or precipitation process, the molecular sieve contains within its pores at least a portion of the template used in making the initial reaction mixture. The crystalline structure of the sieve essentially wraps around the template as it is formed. The template is then completely or partially removed, thus generating an open pore structure.

In many cases, depending upon the nature of the final product formed, the template may be too large to be eluted from the intracrystalline pore system. In such a case, the template can be removed by a heat treatment process. For example, the template can be calcined, or essentially combusted, in the presence of an oxygen-containing gas, by contacting the template-containing sieve in the presence of the oxygen-containing gas and heating at temperatures from 200° C. to 900° C. In some cases, it may be desirable to heat in an environment having a low oxygen concentration. In these cases, however, the result will typically be a breakdown of the template into a smaller component, rather than by the combustion process. This type of process can be used for partial or complete removal of the template from the intracrystalline pore system. In other cases, with smaller templates, complete or partial removal from the sieve can be accomplished by conventional desorption processes such as those used in making standard zeolites.

The reaction mixture can contain one or more templates. Templates are structure directing or affecting agents, and typically contain nitrogen, phosphorus, oxygen, carbon, hydrogen or a combination thereof, and can also contain at least one alkyl or aryl group, with 1 to 8 carbons being present in the alkyl or aryl group. Mixtures of two or more templates can also be used.

Representative templates include tetraethyl ammonium salts, cyclopentylamine, aminomethyl cyclohexane, piperidine, triethylamine, cyclohexylamine, tri-ethyl hydroxyethylamine, morpholine, dipropylamine (DPA), pyridine, isopropylamine and combinations thereof Preferred templates are triethylamine, cyclohexylamine, piperidine, pyridine, isopropylamine, tetraethyl ammonium salts, dipropylamine, and mixtures thereof The tetraethylammonium salts include tetraethyl ammonium hydroxide (TEAOH), tetraethyl ammonium phosphate, tetraethyl ammonium fluoride, tetraethyl ammonium bromide, tetraethyl ammonium chloride, tetraethyl ammonium acetate. Preferred tetraethyl ammonium salts are tetraethyl ammonium hydroxide and tetraethyl ammonium phosphate.

The SAPO molecular sieve structure can be effectively controlled using combinations of templates. For example, in a particularly preferred embodiment, the SAPO molecular sieve is manufactured using a template combination of TEAOH and dipropylamine. This combination results in a particularly desirable SAPO structure for the conversion of oxygenates, particularly methanol and dimethyl ether, to light olefins such as ethylene and propylene.

The silicoaluminophosphate molecular sieve is typically admixed (i.e., blended) with other materials. When blended, the resulting composition is typically referred to as a SAPO catalyst, with the catalyst comprising the SAPO molecular sieve.

Once the first slurry of the present invention is prepared other materials can be mixed with the molecular sieve. These materials include various inert or catalytically active materials, or various binder materials, such as kaolin and other clays, various forms of rare earth metals, metal oxides, other non-zeolite catalyst components, zeolite catalyst components, alumina or alumina sol, titania, zirconia, magnesia, thoria, beryllia, quartz, silica or silica or silica sol, and mixtures thereof. These components are also effective in reducing, inter alia, overall catalyst cost, acting as a thermal sink to assist in heat shielding the catalyst during regeneration, densifying the catalyst and increasing catalyst strength. It is particularly desirable that the inert materials that are used in the catalyst to act as a thermal sink have a heat capacity of from 0.05 cal/g-° C. to 1 cal/g-° C., more preferably from 0.1 cal/g-° C. to 0.8 cal/g-° C., most preferably from 0.1 cal/g-° C. to 0.5 cal/g-° C.

The use of matrix materials such as naturally occurring clays, e.g., bentonite and kaolin, improves the crush strength of the catalyst under commercial operating conditions. Thus, the addition of clays improve upon the attrition resistance or lifetime of the catalyst. The inactive materials also serve as diluents to control the rate of conversion in a given process so that more expensive means for controlling the rate of reaction is minimized. Naturally occurring clays which can be used in the present invention include the montmorillonite and kaolin families which include the sabbentonites, and the kaolins, commonly known as Dixie, McNamee, Georgia and Florida clays, or other in which the main mineral constituent is haloysite, kaolinite, dickite, nacrite, or anauxite. Such clays can be used in the natural state or subjected to calcination, acid treatment or chemical modification.

As with most catalysts clay is used in the invention as an inert densifier, and for the most part the clay has no effect on catalytic activity or selectivity. In most cases, the clay of choice is kaolin. Kaolin's ability to form pumpable, high solid content slurries, low fresh surface area, and ease of packing because of its platelet structure makes it particularly suitable for catalyst processing. The preferred average particle size of the kaolin is 0.1 $\mu$m to 0.6 $\mu$m with a D90 point of about 1 $\mu$m. The iron and titania content of the clay can also be important. High iron or titania levels can lead to undesirable secondary reactions. Because of environmental concerns, the crystalline silica content of the clay has also become an important parameter.

Additional molecular sieve materials can be included as a part of the SAPO catalyst composition or they can be used as separate molecular sieve catalysts in admixture with the SAPO catalyst if desired. Structural types of small pore molecular sieves that are suitable for use in this invention include AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, and substituted forms thereof Structural types of medium pore molecular sieves that are suitable for use in this invention include MFI, MEL, MIW, EUO, MTT, HEU, FER, AFO, AEL, TON, and substituted forms thereof These small and medium pore molecular sieves are described in greater detail in the *Atlas of Zeolite Structural Types*, W. M. Meier and D. H. Olsen, Butterworth Heineman, 3rd ed., 1997, the detailed description of which is explicitly incorporated herein by reference. Preferred molecular sieves which can be combined with a silicoaluminophosphate catalyst include ZSM-5, ZSM-34, erionite, and chabazite. The mixtures can be integrowths or mixtures of various crystalline and/or amorphous phases, or physical mixtures of different molecular sieves.

The catalyst can be subjected to a variety of treatments to achieve the desired physical and chemical characteristics. Such treatments include, but are not necessarily limited to hydrothermal treatment, calcination, acid treatment, base treatment, milling, ball milling, grinding, spray drying, and combinations thereof In this invention, a feed containing an oxygenate, and optionally a diluent or a hydrocarbon added separately or mixed with the oxygenate, is contacted with a catalyst containing a SAPO molecular sieve in a reaction zone or volume. The volume in which such contact takes place is herein termed the "reactor," which may be a part of a "reactor apparatus" or "reaction system." Another part of the reaction system may be a "regenerator," which comprises a volume wherein carbonaceous deposits (or coke) on the catalyst resulting from the olefin conversion reaction are removed by contacting the catalyst with regeneration medium.

The oxygenate feedstock of this invention comprises at least one organic compound which contains at least one oxygen atom, such as aliphatic alcohols, ethers, carbonyl compounds (aldehydes, ketones, carboxylic acids, carbonates, esters and the like). When the oxygenate is an alcohol, the alcohol can include an aliphatic moiety having from 1 to 10 carbon atoms, more preferably from 1 to 4 carbon atoms. Representative alcohols include but are not necessarily limited to lower straight and branched chain aliphatic alcohols and their unsaturated counterparts. Examples of suitable oxygenate compounds include, but are not limited to: methanol; ethanol; n-propanol; isopropanol; $C_4$–$C_{20}$ alchols; methyl ethyl ether; dimethyl ether; diethyl ether; di-isopropyl ether; formaldehyde; dimethyl carbonate; dimethyl ketone; acetic acid; and mixtures thereof. Preferred oxygenate compounds are methanol, dimethyl ether, or a mixture thereof.

The method of making the preferred olefin product in this invention can include the additional step of making these compositions from hydrocarbons such as oil, coal, tar sand, shale, biomass and natural gas. Methods for making the compositions are known in the art. These methods include fermentation to alcohol or ether, making synthesis gas, then converting the synthesis gas to alcohol or ether. Synthesis gas can be produced by known processes such as steam reforming, autothermal reforming and partial oxidization.

One or more inert diluents may be present in the feedstock, for example, in an amount of from 1 to 99 molar percent, based on the total number of moles of all feed and diluent components fed to the reaction zone (or catalyst). As defined wherein, diluents are compositions which are essentially non-reactive across a molecular sieve catalyst, and primarily function to make the oxygenates in the feedstock less concentrated. Typical diluents include, but are not necessarily limited to helium, argon, nitrogen, carbon monoxide, carbon dioxide, water, essentially non-reactive paraffins (especially the alkanes such as methane, ethane, and propane), essentially non-reactive alkylenes, essentially non-reactive aromatic compounds, and mixtures thereof. The preferred diluents are water and nitrogen. Water can be injected in either liquid or vapor form.

Hydrocarbons can also be included as part of the feedstock, i.e., as co-feed. As defined herein, hydrocarbons included with the feedstock are hydrocarbon compositions which are converted to another chemical arrangement when contacted with molecular sieve catalyst. These hydrocarbons can include olefins, reactive paraffins, reactive alkylaromatics, reactive aromatics or mixtures thereof. Preferred hydrocarbon co-feeds include, propylene, butylene, pentylene, $C_4^+$ hydrocarbon mixtures, $C_5^+$ hydrocarbon mixtures, and mixtures thereof. More preferred as co-feeds are a $C_4^+$ hydrocarbon mixtures, with the most preferred being $C_4^+$ hydrocarbon mixtures which are obtained from separation and recycle of reactor product.

In the process of this invention, coked catalyst can be regenerated by contacting the coked catalyst with a regeneration medium to remove all or part of the coke deposits. This regeneration can occur periodically within the reactor by ceasing the flow of feed to the reactor, introducing a regeneration medium, ceasing flow of the regeneration medium, and then reintroducing the feed to the fully or partially regenerated catalyst. Regeneration may also occur periodically or continuously outside the reactor by removing a portion of the deactivated catalyst to a separate regenerator, regenerating the coked catalyst in the regenerator, and subsequently reintroducing the regenerated catalyst to the reactor. Regeneration can occur at times and conditions appropriate to maintain a desired level of coke on the entire catalyst within the reactor.

Catalyst that has been contacted with feed in a reactor is defined herein as "feedstock exposed." Feedstock exposed catalyst will provide olefin conversion reaction products having substantially lower propane and coke content than a catalyst which is fresh and regenerated. A catalyst will typically provide lower amounts of propane as it is exposed to more feed, either through increasing time at a given feed rate or increasing feed rate over a given time.

Any standard reactor system can be used, including fixed bed, fluid bed or moving bed systems. Preferred reactors are co-current riser reactors and short contact time, countercurrent free-fall reactors. Desirably, the reactor is one in which an oxygenate feedstock can be contacted with a molecular sieve catalyst at a weight hourly space velocity (WHSV) of at least about 1 $hr^{-1}$, preferably in the range of from 1 $hr^{-1}$ to 1000 $hr^{-1}$, more preferably from 10 $hr^{-1}$ to 1000 $hr^{-1}$, and most preferably from 20 $hr^{-1}$ to 200 $hr^{-1}$. WHSV is defined herein as the weight of oxygenate, and hydrocarbon which may optionally be in the feed, per hour per weight of the molecular sieve content of the catalyst. Because the catalyst or the feedstock may contain other materials which act as inerts or diluents, the WHSV is calculated on the weight basis of the oxygenate feed, and any hydrocarbon which may be present, and the molecular sieve contained in the catalyst.

Preferably, the oxygenate feed is contacted with the catalyst when the oxygenate is in a vapor phase. Alternately, the process may be carried out in a liquid or a mixed vapor/liquid phase. When the process is carried out in a liquid phase or a mixed vapor/liquid phase, different conversions and selectivities of feed-to-product may result depending upon the catalyst and reaction conditions. The process can generally be carried out at a wide range of temperatures. An effective operating temperature range can be from 200° C. to 700° C., preferably from 300° C. to 600° C., more preferably from 350° C. to 550° C.

The conversion of oxygenates to produce light olefins may be carried out in a variety of catalytic reactors. Reactor types include fixed bed reactors, fluid bed reactors, and concurrent riser reactors. Additionally, countercurrent free fall reactors may be used in the conversion process as described in U.S. Pat No. 4,068,136, the detailed description of which is expressly incorporated herein by reference.

In a preferred embodiment of the continuous operation, only a portion of the catalyst is removed from the reactor and sent to the regenerator to remove the accumulated coke deposits that result during the catalytic reaction. In the regenerator, the catalyst is contacted with a regeneration medium containing oxygen or other oxidants. Examples of other oxidants include $O_3$, $SO_3$, $N_2O$, NO, $NO_2$, $N_2O_5$, and mixtures thereof. It is preferred to supply $O_2$ in the form of air. The air can be diluted with nitrogen, $CO_2$, or flue gas, and steam may be added. Desirably, the $O_2$ concentration in the regenerator is reduced to a controlled level to minimize overheating or the creation of hot spots in the spent or deactivated catalyst. The deactivated catalyst also may be regenerated reductively with $H_2$, CO, mixtures thereof, or other suitable reducing agents. A combination of oxidative regeneration and reductive regeneration can also be employed.

In essence, the coke deposits are removed from the catalyst during the regeneration process, forming a regenerated catalyst. The regenerated catalyst is then returned to the reactor for further contact with feed. Typical regeneration temperatures are in the range of 250° C. to 700° C., desirably in the range of 350° C. to 700° C. Preferably, regeneration is carried out at a temperature range of 450° C. to 700° C.

In one embodiment, the reactor and regenerator are configured such that the feed contacts the regenerated catalyst before it is returned to the reactor. In an alternative embodiment, the reactor and regenerator are configured such that the feed contacts the regenerated catalyst after it is returned to the reactor. In yet another embodiment, the feed stream can be split such that feed contacts regenerated catalyst before it is returned to the reactor and after it has been returned to the reactor.

One skilled in the art will also appreciate that the olefins produced by the oxygenate-to-olefin conversion reaction of the present invention can be polymerized to form polyolefins, particularly polyethylene and polypropylene. Processes for forming polyolefins from olefins are known in the art. Catalytic processes are preferred. Particularly preferred are metallocene, Ziegler/Natta and acid catalytic systems. See, for example, U.S. Pat. Nos. 3,258,455; 3,305, 538; 3,364,190; 5,892,079; 4,659,685; 4,076,698; 3,645, 992; 4,302,565; and 4,243,691, the catalyst and process descriptions of each being expressly incorporated herein by reference. In general, these methods involve contacting the olefin product with a polyolefin-forming catalyst at a pressure and temperature effective to form the polyolefin product.

A preferred polyolefin-forming catalyst is a metallocene catalyst. The preferred temperature range of operation is from 50° C. to 240° C. and the reaction can be carried out at low, medium or high pressure, being anywhere within the range of about 1 bar to 200 bars. For processes carried out in solution, an inert diluent can be used, and the preferred operating pressure from 10 bars to 150 bars, with a preferred temperature of 120° C. to 230° C. For gas phase processes, it is preferred that the temperature generally be from 60° C. to 160° C., and that the operating pressure be from 5 bars to 50 bars.

In addition to polyolefins, numerous other olefin derivatives may be formed from the olefins recovered therefrom. These include, but are not limited to, aldehydes, alcohols, acetic acid, linear alpha olefins, vinyl acetate, ethylene dicholoride and vinyl chloride, ethylbenzene, ethylene oxide, cumene, isopropyl alcohol, acrolein, allyl chloride, propylene oxide, acrylic acid, ethylene-propylene rubbers, and acrylonitrile, and trimers and dimers of ethylene, propylene or butylenes. The methods of manufacturing these derivatives are well known in the art, and therefore, are not discussed herein.

This invention will be better understood with reference to the following examples, which are intended to illustrate specific embodiments within the overall scope of the invention as claimed.

Example 1

A four tube microfiltration (MF) apparatus was used to concentrate a tank of SAPO-34 synthesis slurry. The apparatus comprised a 100 gal feed tank, a centrifugal pump with nominal recirculation rate of 30 gal/min, a four tube microfilter each tube of approximately 1.9 cm in diameter and 3 m long and having a surface area of about 2 ft$^2$, and a permeate collection barrel. The tubes were made of polymeric MF tubes (Koch HFP-276 PVE)

Deionized water was added to synthesis slurry in the feed tank 28. The slurry 30 was pumped out of the feed tank 28 with pump 31 at a discharge pressure of 90±5 psig and through a microfilter 18 having 4 tube-and-shell type filter channels 20. The concentrated slurry was directed back to the feed tank 28, while the permeate stream containing water and other components was directed to tank 34. Temperature of the slurry was maintained between 50° C. and 55° C. after an initial startup period and the permeate flow rate ranged from about 1.8 to 3.0 liters/min.

The starting concentration was approximately 12.5% solids on a dry basis with the liquid portion containing water, unreacted template, tetraethylammonium hydroxide (TEOH) and unflashed dipropylamine, and an unanalyzed mixture of unreacted starting materials containing, aluminum, phosphorus and silica, and byproducts from the synthesis. The starting slurry weighed 440 lbs with a calculated solids content of 55 lbs. The final slurry concentrate was measured to have a dry solids content of 28.4 wt %. No solids were observed to pass through with the permeate. The conductivity of the permeate was reduced from greater than 10,000 μmho/cm to less than 500 μmho/cm after a total of 3.9 lbs of wash water per lb of slurry was added over a 10 hour period. A total of about 600 kg of deionized water were used to wash 200 kg of initial slurry. The permeate was collected and the TEOH concentrated from the water with a nanofilter and recycled back to the reactor.

Having now fully described this invention, it will be appreciated by those skilled in the art that the invention can be performed within a wide range of parameters within what is claimed, without departing from the spirit and scope of the invention

What is claimed is:

1. A process for making a molecular sieve catalyst comprising:

preparing a molecular sieve slurry containing molecular sieve and a fluid, wherein the preparing comprises concentrating the molecular sieve from a preparation mixture with a microfilter to form the molecular sieve slurry and a first permeate;

mixing a binder with the molecular sieve slurry to form a catalyst slurry; and directing the catalyst slurry to a forming unit.

2. The process of claim 1 wherein preparing the molecular sieve slurry further comprises:

washing the molecular sieve and the remaining preparation mixture with a wash fluid; and concentrating the molecular sieve from the wash fluid and the remaining preparation mixture with the microfilter to form the molecular sieve slurry.

3. The process of claim 2 wherein the first permeate is concentrated.

4. The process of claim 2 wherein the wash fluid comprises water.

5. The process of claim 2 further comprising washing the molecular sieve, the remaining preparation mixture, and the wash fluid at least once with an additional amount of wash fluid and concentrating the molecular sieve from the wash fluid and the remaining preparation mixture with the microfilter to form the molecular sieve slurry.

6. The process of claim 1 wherein the forming unit is a spray dryer.

7. The process of claim 2 wherein washing the molecular sieve and concentrating the molecular sieve from the wash fluid and remaining preparation mixture comprises adding the wash fluid to the molecular sieve and the remaining preparation mixture as the molecular sieve is concentrated.

8. The process of claim 2 wherein the microfilter contains a pore size from 0.1 μm to 10 μm.

9. The process of claim 1 wherein the preparing further comprises concentrating the molecular sieve with a macrofilter prior to the concentrating of the molecular sieve from the preparation mixture with the microfilter, the process further comprising washing the molecular sieve and the remaining preparation mixture with a wash fluid; and concentrating the molecular sieve from the wash fluid and the remaining preparation mixture with a microfilter to form the molecular sieve slurry.

10. The process of claim 9 wherein washing the molecular sieve and concentrating the molecular sieve from the wash fluid and remaining preparation mixture comprises adding the wash fluid to the molecular sieve and the remaining preparation mixture as the molecular sieve is concentrated.

11. The process of claim 1 wherein the molecular sieve is selected from the group consisting of SAPO-17, SAPO-18, SAPO-34, SAPO-35, SAPO-44, SAPO-47, ALPO-5, ALPO-11, ALPO-18, ALPO-34, ALPO-36, ALPO-37, ALPO-46, the metal containing forms of each thereof, and mixtures thereof.

12. The process of claim 1 wherein the binder is selected from the group consisting of silica, silica-alumina, and alumina.

13. The process of claim 1 wherein the molecular sieve slurry contains from 20% to 50% by weight of the molecular sieve.

14. The process of claim 13 wherein the molecular sieve slurry contains from 25% to 40% by weight of the molecular sieve.

15. The process of claim 1 further comprising mixing a matrix material with the molecular sieve prior to, with, or following the mixing of the binder with the molecular sieve.

16. The process of claim 15 wherein the matrix material comprises at least one clay.

17. The process of claim 15 wherein the matrix material is present in the amount from 40% to 90% by weight based on the weight of calcined catalyst.

18. The process of claim 1 wherein the binder is present in the amount from 5% to 20% by weight based on the weight of calcined catalyst.

19. The process of claim 1 wherein the catalyst slurry comprises from 30% to 50% weight of solids.

20. The process of claim 1 wherein preparing the molecular sieve slurry comprises concentrating the molecular sieve slurry with a microfilter, wherein the pressure drop across the porous walls of the microfilter is from 10 psi to 80 psi.

21. The process of claim 1 wherein preparing the molecular sieve slurry comprises concentrating the molecular sieve slurry with a microfilter, wherein the temperature of the molecular sieve slurry is from 20° C. to 75° C.

22. The process of claim 1 wherein preparing the molecular sieve slurry comprises concentrating the molecular sieve slurry with a microfilter, wherein the slurry feed rates are 10 L/min per $m^2$ to 60 L/min per $m^2$ of cross-sectional area of the filter medium.

23. The process of claim 2, wherein the first permeate has a conductivity from 50 to 5000 $\mu$mho/cm.

24. The process of claim 3, wherein the first permeate is concentrated with a nanofilter, the process further comprising returning at least a portion of the concentrated first permeate to a process stream used in the preparation of the molecular sieve.

25. The process of claim 2, wherein the first permeate from the microfilter is collected in a first permeate tank.

26. The process of claim 25, wherein the first permeate in the first permeate tank is directed to a permeate concentrator which concentrates the first permeate.

27. The process of claim 26, wherein a portion of the concentrated first permeate is recycled to the first permeate tank.

28. The process of claim 26, wherein the wash fluid is directed to the concentrator and washes the first permeate.

29. The process of claim 26, wherein a portion of the concentrated first permeate is directed to a sieve synthesis unit.

30. The process of claim 26, wherein the concentrating of the first permeate forms a second permeate.

31. The process of claim 30, wherein the second permeate is recycled in the process of the invention.

32. The process of claim 30, wherein the second permeate is directed to a sieve synthesis unit.

33. The process of claim 30, wherein the second permeate is disposed of.

34. The process of claim 30, wherein the second permeate is collected in a second permeate tank.

35. The process of claim 1, wherein the wash fluid comprises water.

* * * * *